United States Patent [19]

Tatemoto et al.

[11] 4,155,953

[45] May 22, 1979

[54] PROCESS FOR PRODUCTION OF MODIFIED POLYCHLOROTRIFLUOROETHYLENE

[75] Inventors: Masayoshi Tatemoto; Tsuneo Nakagawa, both of Osaka, Japan

[73] Assignee: Daikin Kogyo Co., Ltd., Osaka, Japan

[21] Appl. No.: 737,056

[22] Filed: Oct. 29, 1976

[30] Foreign Application Priority Data

Oct. 30, 1975 [JP] Japan ................................. 50-131276

[51] Int. Cl.² ............................................. C08L 23/00
[52] U.S. Cl. ......................... 260/878 R; 260/29.6 F; 260/32.8 R; 260/884; 260/897 R; 260/900
[58] Field of Search ............... 260/884, 29.6 F, 878 R

[56] References Cited

U.S. PATENT DOCUMENTS

| 3,345,317 | 10/1967 | Hoashi | 260/29.6 F |
| 3,798,287 | 3/1974 | Murayama et al. | 260/884 |

*Primary Examiner*—Harold D. Anderson
*Attorney, Agent, or Firm*—Birch, Stewart, Kolasch and Birch

[57] ABSTRACT

A process for production of modified polychlorotrifluoroethylene having a low crystallinity with a good processability, which comprises polymerizing, as a monomeric component, chlorotrifluoroethylene or its mixture with at least one of other polymerizable monomers in an amount of not more than about 50 mol% based on the monomeric component in the presence of a fluorine-containing elastomeric polymer, preferably in the coexistence of water and 1,1,2-trichloro-1,2,2-trifluoroethane.

8 Claims, No Drawings

PROCESS FOR PRODUCTION OF MODIFIED POLYCHLOROTRIFLUOROETHYLENE

The present invention relates to a process for production of modified polychlorotrifluoroethylene having advantageous chemical and physical properties, particularly low crystallinity and good processability.

Polychlorotrifluoroethylene (hereinafter referred to as "PCTFE") is excellent in mechanical properties, transparency, thermal resistance and resistance to chemicals and therefore has been used in various fields as molded articles, films, lining materials, etc. However, PCTFE is apt to be crystallized on molding or use and, as the result of a remarkable increase of crystallinity, deteriorated in the mechanical properties such as breaking strength, elongation and solvent-crack resistance. In order to avoid such deterioration, it may be considered to lower its crystallinity, for instance, by increasing the molecular weight. But, the increase of the molecular weight induces the depression of the melt flow property, which is disadvantageous from the viewpoint of processability. Thus, the appearance of PCTFE which has a low crystallinity while keeping a good processability has been highly demanded.

For the purpose of improving the mechanical properties of PCTFE, it has been proposed to incorporate units of appropriate polymerizable monomers into the molecule of PCTFE by copolymerization of chlorotrifluoroethylene with the said appropriate polymerizable monomers, of which examples are vinylidene fluoride [cf. U.S. Pat. No. 2,738,343], tetrafluoroethylene [cf. Reports of the Government Chemical Industrial Research Institute, Nagoya, Vol. 8, pages 128–137], etc. It has also been proposed to blend suitable materials into PCTFE; examples of such suitable materials are a non-elastomeric copolymer of chlorotrifluoroethylene and vinylidene fluoride [cf. U.S. Pat. No. 2,944,997], inorganic metal salts [cf. Japanese Patent Publication (unexamined) No. 5153/1974]. However, none of them can show a satisfactory effect in lowering the degree of crystallinity of PCTFE.

As the result of the extensive study, it has now been found that the polymerization of chlorotrifluoroethylene in the presence of a fluorine-containing elastomeric polymer provides modified PCTFE having a lowered crystallinity while keeping a good processability. The present invention is based on this finding.

According to the present invention, a monomeric component consisting of chlorotrifluoroethylene or its mixture with at least one of other polymerizable monomers in an amount of not more than about 50 mol% based on the monomeric component is polymerized in the presence of a fluorine-containing elastomeric polymer, preferably in the coexistence of water and 1,1,2-trichloro-1,2,2-trifluoroethane (hereinafter referred to as "R-113"), to give modified PCTFE having a low crystallinity and a good processability.

The monomeric component to be polymerized in the process of this invention may comprise chlorotrifluoroethylene alone or together with one or more of other polymerizable monomers in an amount of not more than about 50 mol% based on the monomeric component. Examples of such polymerizable monomers are tetrafluoroethylene, vinylidene fluoride, vinyl chloride, trifluoroethylene, hexafluoropropene, perfluorobutene-1, perfluoropentene-1, perfluorovinyl ether, ethylene, propene, butene-1, pentene-1, vinyl ether, vinyl acetate, vinyl propionate, vinyl butyrate, methacrylic acid, acrylic acid, etc.

As the fluorine-containing elastomeric polymer, there may be used the one which is scarcely crystallized, can be hardly decomposed or foamed under the condition for molding of PCTFE and does not materially prevent the polymerization of the monomeric component, and which is prepared by any conventional polymerization procedure such as bulk polymerization, solution polymerization, suspension polymerization or emulsion polymerization.

The fluorine-containing elastomeric polymer is desirable to have a number average molecular weight of about 10,000 to 500,000. When the number average molecular weight is less than about 10,000, the mechanical properties of the resultant modified PCTFE may become inferior. When it exceeds about 500,000, the processability of the produced modified PCTFE will not be good.

Specific examples of the fluorine-containing elastomeric polymer are copolymers of tetrafluoroethylene with propene, butene-1, isobutylene, methyl vinyl ether, ethyl vinyl ether, propyl vinyl ether, n-butyl vinyl ether, isobutyl vinyl ether, 2,2-dichloroethyl vinyl ether, 2,2,3,3-tetrafluoropropyl vinyl ether, 2,2,3,3,4,4,5,5-octafluoropentyl vinyl ether, vinyl acetate, vinyl propionate, vinyl butyrate, perfluoroalkyl vinyl ether, hexafluoropropene, 1,1,2,3,3-pentafluoropropene-1, 3,3,3-trifluoropropene-1, trifluoroethylene and vinyl fluoride, copolymers of chlorotrifluoroethylene with propene, butene-1, isobutylene, methyl vinyl ether, ethyl vinyl ether, propyl vinyl ether, n-butyl vinyl ether, isobutyl vinyl ether, 2,2-dichloroethyl vinyl ether, 2,2,3,3-tetrafluoropropyl vinyl ether, 2,2,3,3,4,4,5,5-octafluoropentyl vinyl ether, vinyl acetate, vinyl propionate, vinyl butyrate, perfluoroalkyl vinyl ether, hexafluoropropene, 1,1,2,3,3-pentafluoropropene-1,3,3,3-trifluoropropene-1, trifluoroethylene and vinyl fluoride, copolymers of vinylidene fluoride with hexafluoropropene, tetrafluoroethylene, ethylene, propene, trifluoroethylene, chlorotrifluoroethylene, trifluoropropene, pentafluoropropene, vinyl fluoride and perfluoroalkyl perfluorovinyl ether, etc. Among these elastomeric polymers, particularly preferred are a copolymer of tetrafluoroethylene and an olefin such as propene, butene-1 or isobutene in a molar ratio of 70:30 to 30:70, a copolymer of vinylidene fluoride and hexafluoropropene in a molar ratio of 90:10 tp 50:50, a copolymer of vinylidene fluoride and chlorotrifluoroethylene in a molar ratio of 90:10 to 50:50, etc. The use of amorphous polymers such as terpolymers comprising the monomeric units constituting the said preferred copolymers with the units of other polymerizable monomers such as tetrafluoroethylene in an amount of not more than about 20 mol% based on the total monomer units is also favorable.

The fluorine-containing elastomeric polymer may be used in such an amount that the produced modified PCTFE can contain the said elastomeric polymer in an amount of about 0.1 to 20% by weight. When it is less than about 0.1% by weight, the crystallinity of the produced modified PCTFE will not be sufficiently lowered. When it is more than about 20% by weight, the mechanical properties of the resulting modified PCTFE may be deteriorated.

The polymerization may be carried out in an appropriate medium such as water, R-113, 1,2-dichloro-1,1,2,2-tetrafluoroethane, trichlorofluoroethane, dichlorodifluoromethane or perfluorocyclobutane. The use of a mixture of water and R-113 (usually having a water content of not less than about 50% by weight) is particularly favorable since the modified PCTFE having a more uniform composition is obtainable. If necessary, a conventional dispersion stabilizer may be added to the reaction system.

For initiation of the polymerization, there may be used any radical source which can induce the polymerization with a practical polymerization rate at a temperature of from about −30° to 45° C. Usually, the decomposition of an organic or inorganic peroxide, the Redox decomposition with a reducing agent added thereto, the application of ionizing radiation or the like is utilized. Examples of the organic peroxide are dialkyl peroxydicarbonates (e.g. diisopropyl peroxydicarbonate, di(t-butylcyclohexyl) peroxydicarbonate), diacyl peroxides (e.g. diisobutyryl peroxide), peroxy esters (e.g. di-t-butyl peroxyoxalate), di(fluoro or fluorochloroacyl) peroxides (e.g. di(ω-hydrooctafluoropentanoyl) peroxide, di(ω-hydrododecafluoroheptanoyl) peroxide, di(trichloroperfluorohexanoyl) peroxide, di(perfluorohexanoyl) peroxide), acetylcyclohexylsulfonyl peroxide, etc. Examples of the inorganic peroxide are hydrogen peroxide, ammonium persulfate, potassium persulfate, sodium persulfate, etc. The Redox catalyst comprising any one of the said organic and inorganic peroxides and a reducing agent such as sodium hydrogensulfite is also utilizable. When the said peroxide is employed, its amount may be usually from about 0.01 to 10 % by weight based on the weight of the produced modified PCTFE, although any amount outside the said range is sometimes usable.

The polymerization may be carried out in a conventional procedure such as emulsion polymerization, suspension polymerization or bulk polymerization, among which suspension polymerization or bulk polymerization is particularly preferred from the industrial viewpoint. Also, it may be effected in any conventional reaction apparatus, and the use of a stainless steel made reaction vessel or a glass lining reaction vessel equipped with an agitator is favorable.

In case of the suspension polymerization using water and R-113, the weight ratio of the monomeric component, the fluorine-containing elastomeric polymer, water and R-113 may be usually about 1:0.001–1:0–7:0–2.

No particular limitation is present on the polymerization temperature, but it is usually preferred to be within a range of about −30° to 45° C.

From the practical viewpoint, the polymerization of the monomeric component in the presence of the fluorine-containing elastomeric polymer may be carried out subsequently to the production of the fluorine-containing elastomeric polymer. In such case, a certain amount of the monomers used for the production of the fluorine-containing elastomeric polymer may remain in the reaction system of the said polymerization.

The modified PCTFE thus produced seems to be a polymer wherein PCTFE is somewhat bonded to the fluorine-containing elastomeric polymer, since a mixture obtained by solely blending PCTFE with the fluorine-containing elastomeric polymer by a conventional mechanical aid is inferior in homogeneity to and different in physical properties from such modified PCTFE. For instance, the general tendency of the physical properties of the PCTFE blend and of the modified PCTFE are comparatively shown in the following table:

|  | PCTFE Blend | Modified PCTFE |
| --- | --- | --- |
| Degree of crystallinity | Same as PCTFE | Decreased (compared with PCTFE) |
| Transparency | No good | Good |
| Yield strength | Decreased (compared with PCTFE) | Same as PCTFE |

In order to enhance the transparency of the produced modified PCTFE, it may be treated with an organic solvent such as acetone or n-hexane to eliminate the fluorine-containing elastomeric polymer free from PCTFE (i.e. not bonded with PCTFE) by extraction. The extraction can be carried out in a per se conventional procedure, for instance, by the use of a Soxhlet extractor.

The thus obtained modified PCTFE may be molded by a conventional molding procedure such as compression molding, extrusion molding or injection molding to make a shaped article which is much lower in crystallinity and more excellent in processability than a shaped article obtained by molding PCTFE itself. The modified PCTFE is, in addition, useful as a material for manufacture of films, coating compositions, lining compositions, wire coating compositions, etc.

Practical and presently preferred embodiments of the present invention are illustratively shown in the following Examples wherein % and parts are by weight.

EXAMPLE 1

(A) Into a jacketed reaction tank equipped with an agitator, in which the atmosphere was previously replaced by nitrogen gas and then evacuated, R-113 (1870 parts) was charged, and a mixture of tetrafluoroethylene (500 parts) and propene (30 parts) was pressed therein. Under the maintenance of the temperature and the pressure in the reaction tank respectively at 24° C. and 3.8 kg/cm$^2$G, di-(trichloroperfluorohexanoyl) peroxide (1.1 parts) was added to the reaction system while agitation, and polymerization was carried out for 155 minutes, during which propene was added thereto for keeping the said pressure. From the reaction mixture, the produced fluorine-containing rubbery polymer (65 parts) was separated by a conventional procedure. The molar ratio of tetrafluoroethylene and propene in the polymer was 55:45, and the intrinsic viscosity was [$\eta$]=1.66 (determined in methylethylketone at 35° C.).

(B) Into the same reaction tank as above, demineralized and deaerated water (1000 parts) was charged, and the atmosphere therein was replaced by nitrogen gas and then evacuated. A solution of the above obtained fluorine-containing elastomeric polymer in R-113 having a polymer content of 4.0% (185 parts) was pressed to the reaction tank, and chlorotrifluoroethylene (600 parts) was pressed thereto. The temperature in the reaction tank was adjusted to 20° C. and agitation was initiated. After the addition of di(trichloroperfluorohexanoyl) peroxide (0.2 part) to the reaction system, polymerization was carried out for 20 hours. From the reaction mixture, the unreacted chlorotrifluoroethylene was eliminated, and the collected polymer was washed with water and dried. The resulting powdery polymer (27 parts) was treated with acetone using a Soxhlet extractor for 20 hours to eliminate 6 parts of the fluorine-containing elastomeric polymer free from PCTFE, whereby the modified PCTFE having a rubber content of 6.6% was obtained in a powdery form.

Using a Koka flow tester, the modified PCTFE was extruded through a nozzle of 1 mm in diameter and 1 mm in length under a charge of 100 kg/cm² at 230° C. The flow rate was $1.5 \times 10^{-2}$ cm³/sec.

The modified PCTFE (16 g) was charged in a mold for manufacture of round sheets consisting of a cylinder (outer diameter, 128 mm; inner diameter, 80 mm; thickness, 25 mm), an upper platen (diameter, 79 mm; thickness, 15 mm) and a lower platen (diameter, 79 mm; thickness, 12 mm), which was placed between heat press plates at 250° C. for 5 minutes, and molding was effected under a pressure of 80 kg/cm²G. After 2 minutes, the mold was cooled with water, and a transparent sheet was obtained.

EXAMPLE 2

Polymerization was carried out as in Example 1 ((B) but an additional amount of 0.4 part of di(trichloroperfluorohexanoyl) peroxide was added to the reaction system 16 hours after the initiation of the polymerization and the polymerization was carried out for 27 hours, whereby the modified PCTFE having a rubber content of 1.2% (154 parts) was obtained in a powdery form. When measured as in Example 1 (B), the flow rate was $9.4 \times 10^{-3}$ cm³/sec.

Molding of the modified PCTFE in the same procedure as in Example 1 (B) gave a transparent sheet.

COMPARATIVE EXAMPLE 1

Polymerization was carried out as in Example 1 (B) but the fluorine-containing elastomeric polymer and R-113 were not used and 0.58 part of di(trichloroperfluorohexanoyl) peroxide was added to the reaction system, whereby a polymer (81 parts) was obtained in a powdery form. When measured as in Example 1 (B), the flow rate was $1.4 \times 10^{-2}$ cm³/sec.

Molding of the said polymer in the same procedure as in Example 1 (B) gave a transparent sheet.

COMPARATIVE EXAMPLE 2

Polymerization was carried out as in Example 1 (B) but the fluorine-containing elastomeric polymer and R-113 were not used and 0.023 part of di(trichloroperfluorohexanoyl) peroxide was added to the reaction system, whereby a polymer (17 parts) was obtained in a powdery form. When measured as in Example 1 (B), the flow rate was $2.1 \times 10^{-4}$ cm³/sec.

Molding of the said polymer in the same procedure as in Example 1 (B) gave a transparent sheet.

The transparent sheets obtained in Examples 1 and 2 and Comparative Examples 1 and 2 were annealed at 195° C. for 6 hours, and the annealed sheets were subjected to measurement of crystallinity, mechanical properties and solvent-crack resistance in the following procedures:

(1) Crystallinity

A test piece (about 20 mg) obtained by cutting the annealed sheet was weighed, and the calory for melting was measured by the use of a differential calorimeter Type II (manufactured by Perkin-Elmer) at a temperature elevation speed of 40° C./mm. From the calibration curve on the relationship between the calory for melting of PCTFE and the crystallinity of PCTFE as previously prepared, the crystallinity was determined.

The crystallinity of PCTFE ($\theta$) was calculated by the following equation given in T. Satokawa et al.: Series of Plastic Materials, Vol. 6, "Fluororesins", page 152 (1969):

$$\theta = (d_4^{30} - 2.072/2.183 - 2.072) \times 100 \, (\%)$$

wherein $d_4^{30}$ indicates the specific gravity at 30° C. and 2.072 and 2.183 correspond respectively to the specific gravity of the perfect amorphous material and the specific gravity of the perfect crystalline material.

(2) Breaking Strength & Elongation

A test piece obtained by cutting the annealed sheet of 1.6 to 1.9 mm in thickness using a No. 3 dumbbell as specified in JIS (Japanese Industrial Standard) K6301 was subjected to measurement at 25° C. with a pulling rate of 100 mm/min by the use of a tensile tester (Tensilon tensile tester Type UTII).

(3) Solvent-crack resistance

A test piece of 38 mm in length, 10 mm in width and 1.6 to 1.9 mm in thickness obtained from the annealed sheet was notched at the central part and kept by a holder as specified in ASTM (American Society for Testing and Materials) D1693-70. The test piece was immersed in n-hexane at 250° C. for 24 hours and then taken out. The formation of cracks was macroscopically observed.

The results are shown in the following table:

| Physical properties | Example 1 | Example 2 | Comparative 1 | Comparative 2 |
|---|---|---|---|---|
| Flow rate (cm³/sec) | $1.5 \times 10^{-2}$ | $9.4 \times 10^{-3}$ | $1.4 \times 10^{-2}$ | $2.1 \times 10^{-4}$ |
| Crystallinity ($\theta$) (%) | 51.0 | 58.3 | 60.4 | 52.0 |
| Breaking strength (kg/cm²) | 372 | 428 | 461 | — |
| Elongation (%) | 198 | 242 | 50< | — |
| Solvent-crack resistance | No crack | No crack | Crack | — |

EXAMPLE 3

Polymerization was carried out as in Example 1 (B) but 0.17 part of di(trichloroperfluorohexanoyl) peroxide was added to the reaction system, whereby the modified PCTFE having a rubber content of 12.9% was obtained. When measured as in Example 1 (B), the flow rate was more than $2 \times 10^{-1}$ cm³/sec.

Molding of the modified PCTFE in the same procedure as in Example 1 (B) gave a sheet, which showed a crystallinity of 43.2% after annealing at 195° C. for 6 hours.

EXAMPLE 4

Polymerization was carried out as in Example 1 (B) but a solution of a vinylidene fluoride/hexafluoropropene copolymer having a molar ratio of vinylidene fluoride and hexafluoropropene of 53:47 and an intrinsic viscosity of $[\eta] = 0.52$ (determined in methylethylketone at 35° C.) in R-113 having a polymer content of 1.1% (300 parts) and di(trichloroperfluorohexanoyl) peroxide (0.64 part) were used, whereby the modified PCTFE (132 parts) was obtained in a powdery form. When measured as in Example 1 (B), the flow rate was 8.6×10$^{-2}$ cm$^3$/sec.

Molding of the modified PCTFE gave a sheet, which was somewhat opaque after annealing.

What is claimed is:

1. A process for production of modified polychlorotrifluorethylene having a low crystallinity and good processability, which comprises polymerizing, as a monomeric component, chlorotrifluoroethylene or its mixture with at least one of other polymerizable monomers in an amount of not more than 50 mol % based on the monomeric component in the presence of a fluorine-containing elastomeric polymer selected from the group consisting of a copolymer of tetrafluoroethylene and an olefin selected from the group consisting of propene, butene-1 and isobutene in a molar ratio of 70:30 to 30:70, a copolymer of vinylidene fluoride and hexafluoropropene in a molar ratio of 90:50 to 50:50 and a copolymer of vinylidene fluoride and chlorotrifluoroethylene in a molar ratio of 90:10 to 50:50, and those ternary polymers corresponding to said copolymers with tetrafluoroethylene as a third monomeric unit in an amount of not more than 20 mol % of the total monomer units, said elastomeric polymer being present in an amount of about 0.1 to 20% by weight based on the amount of the produced, modified polychlorotrifluoroethylene.

2. The process according to claim 1, wherein the fluorine-containing elastomeric polymer has a number average molecular weight of about 10,000 to 500,000 obtained by the intrinsic viscosity method, determined in methylethylketone at 35° C.

3. The process according to claim 1, wherein the polymerization is carried out by the application of a radical source.

4. The process according to claim 3, wherein the radical source is the one which can induce the polymerization at a temperature of about −30° to 45° C.

5. The process according to claim 1, wherein the polymerization is carried out in the presence of water and 1,1,2-trichloro-1,2,2-trifluoroethane.

6. The process according to claim 5, wherein the weight ratio of the monomeric component, the fluorine-containing elastomeric polymer, water and 1,1,2-trichloro-1,2,2-trifluoroethane is about 1:0.001–1:0–7:0–2.

7. The process according to claim 1, wherein the polymerization is carried out at a temperature of about −30° to 45° C.

8. The process according to claim 1, wherein the produced modified polychlorotrifluoroethylene is extracted by treatment with an inert organic solvent.